(12) United States Patent
Björklund

(10) Patent No.: US 11,566,675 B2
(45) Date of Patent: Jan. 31, 2023

(54) INTELLIGENT GRAPHITE DEVICE

(71) Applicant: AB Dynamoborstfabriken, Vadstena (SE)

(72) Inventor: Erik Björklund, Vadstena (SE)

(73) Assignee: AB Dynamoborstfabriken, Vadstena (SE)

(*) Notice: Subject to any disclaimer, the term of this patent is extended or adjusted under 35 U.S.C. 154(b) by 79 days.

(21) Appl. No.: 16/981,900

(22) PCT Filed: Mar. 15, 2019

(86) PCT No.: PCT/EP2019/056527
§ 371 (c)(1),
(2) Date: Sep. 17, 2020

(87) PCT Pub. No.: WO2019/179886
PCT Pub. Date: Sep. 26, 2019

(65) Prior Publication Data
US 2021/0115991 A1 Apr. 22, 2021

(30) Foreign Application Priority Data
Mar. 21, 2018 (SE) .................... 1850316-9

(51) Int. Cl.
*F16D 66/02* (2006.01)
*F16D 65/092* (2006.01)
*F16D 66/00* (2006.01)

(52) U.S. Cl.
CPC ......... *F16D 66/027* (2013.01); *F16D 65/092* (2013.01); *F16D 2066/001* (2013.01); *F16D 2066/005* (2013.01)

(58) Field of Classification Search
CPC ............ F16D 66/027; F16D 2066/001; F16D 65/092; F16D 2066/006; F16D 66/02; F16D 66/021; F16D 2066/005
See application file for complete search history.

(56) References Cited

U.S. PATENT DOCUMENTS

| 3,973,648 A | 8/1976 | Hummert et al. |
| 4,316,186 A | 2/1982 | Purdy et al. |
| 4,334,188 A | 6/1982 | Dudley |
| 4,636,778 A | 1/1987 | Corkran |
| 4,950,933 A | 8/1990 | Pipkin et al. |

(Continued)

FOREIGN PATENT DOCUMENTS

| CN | 2565169 Y | 8/2003 |
| CN | 1518174 A | 8/2004 |

(Continued)

OTHER PUBLICATIONS

Verbruggen, "Wind Turbine Operation & Maintenance based on Condition Monitoring WT-Ω," published by ECN Wind Energy, published Apr. 2003, (document No. ECN-C-03-047), (39 pages).

(Continued)

*Primary Examiner* — Pamela Rodriguez
(74) *Attorney, Agent, or Firm* — Kagan Binder, PLLC

(57) ABSTRACT

A graphite material device (1), wherein the graphite material device is provided, internally and/or externally, with at least one conductive pattern (2) and/or at least one sensor (2) and wherein the graphite material device is used as any one of a carbon brush, a brake disc, a bushing and a bearing.

21 Claims, 1 Drawing Sheet

(56) References Cited

U.S. PATENT DOCUMENTS

| | | | |
|---|---|---|---|
| 6,041,287 A | 3/2000 | Dister et al. | |
| 6,359,690 B1 | 3/2002 | Discenzo et al. | |
| 6,522,247 B2 | 2/2003 | Maruyama et al. | |
| 6,925,385 B2 | 8/2005 | Ghosh et al. | |
| 6,960,922 B2 | 11/2005 | Klaar | |
| 6,966,754 B2 | 11/2005 | Wobben | |
| 7,013,203 B2 | 3/2006 | Moore et al. | |
| 7,027,808 B2 | 4/2006 | Wesby | |
| 7,034,706 B1 | 4/2006 | Nippes | |
| 7,143,007 B2 | 11/2006 | Long | |
| 7,161,493 B2 | 1/2007 | Itou et al. | |
| 7,705,744 B2 | 4/2010 | Cutsforth | |
| 7,877,216 B2 | 1/2011 | Wright et al. | |
| 8,384,266 B2 | 2/2013 | Fish et al. | |
| 8,618,943 B2 | 12/2013 | Cutsforth et al. | |
| 8,825,800 B2 | 9/2014 | Cutsforth | |
| 9,353,815 B1* | 5/2016 | Eden | F16D 66/024 |
| 9,590,376 B2 | 3/2017 | Cutsforth | |
| 10,249,999 B2 | 4/2019 | Cutsforth | |
| 10,790,629 B2 | 9/2020 | Cutsforth | |
| 11,211,757 B2 | 12/2021 | Cutsforth et al. | |
| 2003/0011388 A1 | 1/2003 | Klaar | |
| 2004/0155553 A1 | 8/2004 | Wang | |
| 2006/0070435 A1 | 4/2006 | LeMieux et al. | |
| 2009/0153089 A1 | 6/2009 | Hobelsberger | |
| 2011/0104518 A1 | 5/2011 | Tender | |
| 2012/0248929 A1 | 10/2012 | Fish et al. | |
| 2013/0154448 A1 | 6/2013 | Schick | |
| 2015/0357780 A1 | 12/2015 | Steinbach et al. | |
| 2017/0002883 A1* | 1/2017 | Donzelli | F16D 66/021 |
| 2020/0388974 A1 | 12/2020 | Cutsforth | |

FOREIGN PATENT DOCUMENTS

| | | |
|---|---|---|
| CN | 1306687 C | 3/2007 |
| CN | 2899201 Y | 5/2007 |
| CN | 201122782 Y | 9/2008 |
| CN | 101369706 A | 2/2009 |
| CN | 201263032 Y | 6/2009 |
| CN | 101566673 A | 10/2009 |
| CN | 101567607 A | 10/2009 |
| CN | 101567608 A | 10/2009 |
| CN | 201378673 Y | 1/2010 |
| CN | 202282544 U | 6/2012 |
| CN | 102565700 A | 7/2012 |
| CN | 103151668 A | 6/2013 |
| CN | 203406491 U | 1/2014 |
| DE | 10257623 A1 | 7/2004 |
| DE | 102008028017 A1 | 12/2008 |
| EP | 1271716 A1 | 1/2003 |
| EP | 1441422 A2 | 7/2004 |
| EP | 1560143 A2 | 8/2005 |
| EP | 2071681 A2 | 6/2009 |
| EP | 2112518 A1 | 10/2009 |
| JP | S61142943 A | 6/1986 |
| JP | 08054226 A | 2/1996 |
| JP | 2003102150 A | 4/2003 |
| JP | 2008164377 A | 7/2007 |
| JP | 2014055322 A | 3/2014 |
| JP | 2014178270 A | 9/2014 |
| WO | 9904460 A1 | 1/1999 |
| WO | 01/77525 A1 | 10/2001 |
| WO | 2012077227 A1 | 6/2012 |
| WO | 2012112931 A2 | 8/2012 |
| WO | 2016189134 A1 | 12/2016 |

OTHER PUBLICATIONS

"Reliance Electric FlexPak 3000 Digital DC Variable Speed Drives Product Summary," Rockwell Automation, published May 2001, (12 pages).

"I-brush", Mersen, pp. 1-4, Mersen Copyright 2017, (4 pages).

Chinese First Office Action for Chinese Application No. 201980019416. 9, dated Nov. 3, 2021, (7 pages).

International Search Report for International Application No. PCT/EP2019/056527, dated Jul. 17, 2019 (16 pages).

Indian Office Action for Indian Application No. 202027041849, dated Apr. 25, 2022, (7 pages).

"Brush Monitor Detector Kits," MaxPak Plus Accessory, retrieved from 'https://manualmachine.com/rockwellautomation/maxpakplusespbrushmonitordetector/1621186-user-manual/,' Copyright 1992, (4 pages).

Japanese Office Action, and English Translation thereof, for Japanese Application No. 2020-549017, dated Oct. 4, 2022, (12 pages).

E-Space net English Abstract and Machine Translation for JP 2003102150 A.

E-Space net English Abstract and Machine Translation for JP 2008164377 A.

E-Space net English Abstract and Machine Translation for JP 2014178270 A.

E-Space net English Abstract and Machine Translation for JP 2014055322 A.

* cited by examiner

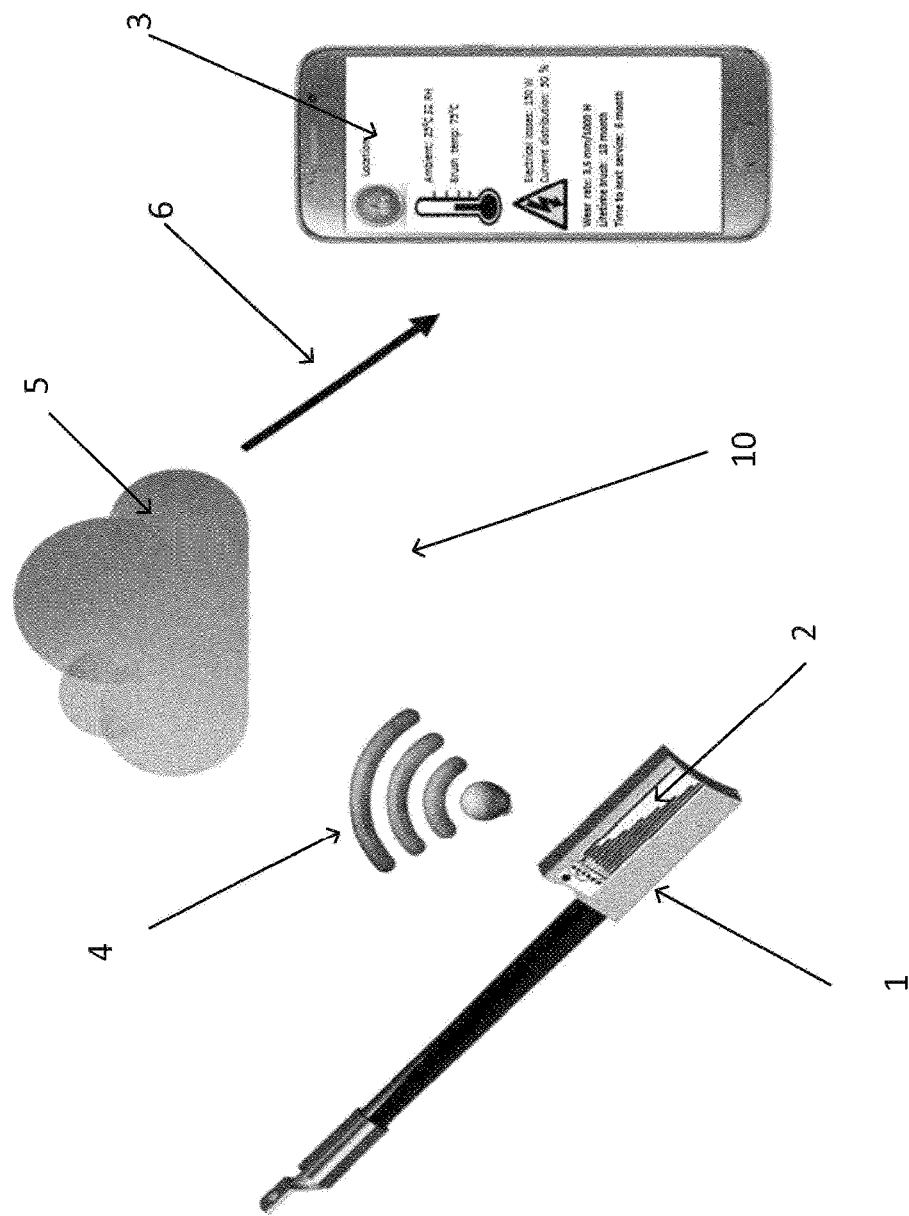

INTELLIGENT GRAPHITE DEVICE

CROSS-REFERENCE TO RELATED APPLICATIONS

This application claims priority to International Application No. PCT/EP2019/056527, filed Mar. 15, 2019 and titled "INTELLIGENT GRAPHITE DEVICE," which in turn claims priority from a Swedish Patent Application having serial number 1850316-9, filed Mar. 21, 2018 titled "INTELLIGENT GRAPHITE DEVICE," both of which are incorporated herein by reference in their entireties

TECHNICAL FIELD

The present document relates to intelligent graphite devices.

More particularly, the present disclosure relates to graphite devices provided with a conductive pattern and/or sensors, and uses thereof.

BACKGROUND

Devices comprising graphite are used in many different technologies. Usually these devices are used as consumption or wearing parts, such as for instance carbon brushes in electrical applications, brake disks in vehicles and as bushings and bearings.

In some applications there is a need to be able to monitor, e.g. the wear of the graphite devices and other parameters that affect the quality and utilization ratio of these devices.

In U.S. Pat. No. 7,877,216B2 a brake system, such as brake disk is described having a sensor-wear material embedded within the friction material of the brake.

There is a need to be able to provide devices such as brake discs, but also other consumption and wearing parts, with monitoring possibilities to improve and monitor the security, duration and life length of these devices.

SUMMARY

It is an object of the present disclosure, to provide an improved graphite device, which eliminates or alleviates at least some of the disadvantages of the prior art graphite devices.

The object is wholly or partially achieved by a graphite device and a method according to the appended independent claims. Embodiments are set forth in the appended dependent claims, and in the following description and drawings.

According to a first aspect, there is provided a graphite material device, wherein the graphite material device is provided, internally and/or externally, with at least one conductive pattern and/or at least one sensor.

By providing the graphite device directly with a conductive pattern and/or a sensor an easy and reliable monitoring of the characteristics of the graphite material device may be achieved. The characteristics that may be monitored are for instance wear, temperature, vibrations, shear, friction and electrical losses etc. The characteristics may either be measured directly by signals provided by the conductive pattern or sensors, or be calculated based on these signals. This may provide for a more digital way of monitoring devices such as carbon brushes and brake discs, by providing a real-time status of these devices, instead of just indicating when they are for instance worn out. It ensures a safer operation of different types of electrical machines and vehicles, and simplifies service of the machines and vehicles incorporating these devices. Signals may for instance be sent to a service function well before e.g. a carbon brush is worn out, thus minimizing the risk that an electrical machine comes to an unwanted stand still or is damaged through uneven wear of the carbon brush. It may also be used in vehicles, where signals could be sent directly to the service facility. In turn this could provide enormous economic gains, with reduced need of keeping these spare parts in storage, and in a more efficient way of providing service and reparation operations.

The at least one conductive pattern and/or at least one sensor may be provided onto or integrated into at least a portion of a surface of said device and the at least one conductive pattern and/or at least one sensor may be integrated into said device by etching into or printing onto at least a portion of said surface.

By integrating the conducting pattern or sensor into the device, there is provided a robust device, which does not contain any removable parts that might impair the functioning of the device. Further, the integration of the conduction pattern or sensor could easily be made a part of the production process, which allows for an efficient and economical way of manufacturing the device.

Alternatively, the least one conductive pattern and/or at least one sensor may be attached to at least a portion of said surface.

By attached to is meant that the conductive pattern or sensor is applied to the device, for instance using adhesives or heat melting or other means of attachment. The conductive pattern may for instance have been printed or etched into a polymer plate, or other material, which is attached to a surface or a side of the device. Further sensors, such as high resistance wires, may be attached to the device for instance by using adhesives or other type of secure attachments.

The at least one conductive pattern and/or at least one sensor may according to yet an alternative be provided on an inside of the device.

This means that the conductive pattern or the sensor may have been provided through a bore hole in the device, or that the device is manufactured in at least two portions and when joined the conductive pattern or sensor is arranged on an inwardly facing surface of the device.

The at least one conductive pattern may be a circuit board.

The said sensor or sensors may be any one of a temperature sensor, a strain gauge and a high resistance cable, an accelerometer or a combination thereof.

The sensor provided onto the device may be a sensor that provides an instant measurement value, or a signal which is calculated or computed into a measurement value.

The said conductive pattern and/or sensor may be arranged to transmit signals to a signal receiving and/or signal processing unit.

By signal receiving and/or signal processing unit is meant any device which is capable of receiving the signals for the conducting pattern and sensor. The unit may also be able to process the signal, for instance compute or calculate different measurement values from the signal. The measurement values may then be presented or visualized in different formats suitable for the application.

The unit may be arranged remotely from or integrated with the device.

The signals may be transmitted wirelessly or through wires. The wireless transmission may be through Bluetooth®. The wireless transmission may also be of any other type conceivable to the skilled person.

The graphite material may be any one of a natural graphite, an electro graphite and a metal graphite.

The graphite material may be a sintered metal graphite.

The graphite device may be any one of a carbon brush, a brake disk, a bushing and a bearing.

The device may be a consumption or wearing part.

According to a second aspect there is provided a system comprising the graphite material device according to the first aspect and a signal receiving and/or processing unit. The signal receiving and/or processing unit may be any one of a computer box, an application interface, and a cloud based unit, or any other unit suitable for receiving and/or processing signals.

According to a third aspect there is provided a method for monitoring the graphite material device according to the first aspect, wherein the method comprises the following steps:

providing a graphite material device with a conductive pattern and/or at least one sensor;

placing said graphite material device in an application where it is used;

using said graphite material device in said application; and receiving signals from said conductive pattern and/or sensors by a signal receiving and/or processing unit, whereby said signals are used to monitor said graphite material device.

According to a fourth aspect there is provided the use of a graphite material device according to the first aspect as any one of a carbon brush, a brake disc, a bushing and a bearing.

BRIEF DESCRIPTION OF THE DRAWINGS

Embodiments of the present solution will now be described, by way of example, with reference to the accompanying schematic drawing.

FIG. 1 is a schematic view of one embodiment of a device and a system according to the invention.

DESCRIPTION OF EMBODIMENTS

FIG. 1 illustrate a system 10 comprising a graphite material device 1, provided with a conductive pattern 2, a signal receiving and/or processing unit 5 and a display device 3.

In one embodiment the graphite material device may be a consumption or wearing part.

In one alternative the graphite material device may be any one of a carbon brush, a brake disk, a bushing and a bearing.

The graphite material of the graphite material device may be any one of a natural graphite, an electro graphite and a metal graphite.

According to one embodiment the graphite material is a sintered metal graphite.

The graphite material device is provided with at least one conductive pattern 2, and/or at least one sensor 2.

As illustrated in FIG. 1 the graphite material device 1 may be a carbon brush, provided with a conductive pattern 2. In FIG. 1 this is illustrated as a circuit board. As shown, the conductive pattern comprises a plurality of traces progressively distanced from the wear surface of the graphite material device.

The conductive pattern 2 may thus be a circuit board which is provided onto the surface of the device 1, or arranged within the device 1. The conductive pattern 1 may be applied to or provided on the device 1 in different ways. One alternative is to print the conductive pattern onto the surface. Another alternative is to use etching techniques to provide the surface of the device with the conductive pattern. Etching or printing techniques are well-known to the skilled person and can easily be introduced into a manufacturing method of the device, without losing efficiency or incurring any substantial additional costs.

The conductive pattern 2 may also be provided onto the device as a separate device, where the conductive pattern for instance is attached by utilizing different types of adhesives, such as for instance glue, hot melting etc. that are suitable for the use of the graphite material device.

The conductive may also be provided on an inside of the device, for instance by having a hole drilled in the device or by attaching two portions of the device to each other and containing the sensor on the inside. The conductive pattern may for instance be printed onto or etched into one portion of the device and then contained within the device once the portions have been attached to each other.

The graphite material device may also be provided with at least one sensor 2, the sensor or sensors may be provided in addition to the conductive pattern. Alternatively, the device 1 is only provided with at least one sensor 2. The sensor or sensors 2 may be arranged to detect different physical properties of the device itself and the ambient surroundings. The sensor or sensors may for instance be arranged to detect temperature, vibration, electrical losses, acceleration, wear etc. The senor or sensors may therefore be sized and adapted to fit onto the device.

The sensor or sensors 2 may be provided onto or into the surface of the device, or at least onto a portion of the surface. The sensor may for instance be printed onto the device, or attached to the device by using etching techniques. The sensor may alternatively be attached to the device by using adhesive techniques, such as glue or hot melting techniques etc. depending on the type of sensor and the type of device on/in which it is used.

The sensor may also be provided on an inside of the device, for instance by having a hole drilled in the device or by attaching two portions of the device to each other and containing the sensor on the inside. The sensor or sensors may for instance be printed onto or etched into one portion of the device and then contained within the device once the portions have been attached to each other.

As examples the sensor or sensors may be any one of a temperature sensor, a strain gauge and a high resistance cable, an accelerometer or a combination thereof.

When the device 1 is in use, for instance as a brake disc in a vehicle or as a carbon brush arranged to engage a slip ring in an electrical machine (these uses are not shown in the drawings) the conductive pattern and/or sensors will provide at least one signal receiving and/or processing unit 5 with at least one signal.

The signals from the conductive pattern and/or the sensor (s) may be transmitted through wires (not shown) or wirelessly 4, as illustrated in FIG. 1. The wireless transmission may be achieved through Bluetooth®.

The signal or signals may be processed by the signal receiving and/or processing unit 5, or by any other unit (not disclosed) and then transmitted 6 to a display device 3. In FIG. 1 the display device 3 is illustrated as a hand held device, e.g. a smart phone, but the display device may be any type of device capable of displaying a result of the signals sent from the conductive pattern and/or the sensors. The display device may for instance be a lamp, lighting up as a response to a signal sent from the conductive pattern and/or sensor. According to one embodiment the signal receiving/processing unit and the display device may be an integrated device.

In one alternative the signal receiving and/or processing unit may be two physically separate devices. In one alternative the signal receiving and/or processing unit may be an or one integrated device.

The signal receiving and processing may also take place in a cloud based application.

The signal receiving and/or processing unit may be arranged in proximity to, or even attached to device 1, or be placed remotely.

As an example the signal receiving and/or processing unit 5 may be any one of a computer box, an application interface, and a cloud based unit.

The signal receiving and/or processing device 5 may be arranged to receive signals from the conductive pattern(s) and/or sensor(s) and transform, convert or compute a result based on these signals. The result may then be visualized or presented in different ways. As illustrated in FIG. 1 the signals may be sent to an application in a smart phone, displaying the temperature, the location of the device (e.g. by using a geo-location sensor such as a GPS attached to the device), and electrical losses and wear rate etc.

In another alternative the signals are converted and displayed in the communication system of a vehicle such as a car, for instance indicating the temperature of the brake discs, or the wear status of the brake discs.

This may provide for a digital way of monitoring devices such as carbon brushes and brake discs, by providing a real-time status of these devices, instead of just indicating when they are for instance worn out.

The invention claimed is:

1. A graphite material device comprising a wear surface, wherein the graphite material device is provided with at least one conductive pattern comprising a plurality of traces progressively distanced from the wear surface of the graphite material device, wherein the at least one conductive pattern is provided as a circuit board, and wherein wear of the graphite material device is measured by signals provided by the conductive pattern as the graphite material device wears from the wear surface.

2. The graphite material device as claimed in claim 1, wherein the graphite material is any one of a natural graphite, an electro graphite and a metal graphite.

3. The graphite material device as claimed in claim 2, wherein the graphite material is a sintered metal graphite.

4. A system comprising the graphite material device as claimed in claim 1, and a signal receiving and/or processing unit.

5. The system as claimed in claim 4, wherein the signal receiving and/or processing unit is any one of a computer box, an application interface, and a cloud based unit.

6. A method for monitoring the graphite material device as claimed in claim 1, wherein the method comprises the following steps:
providing the graphite material device with the conductive pattern comprising the plurality of traces progressively distanced from the wear surface of the graphite material device;
placing the graphite material device in an application where it is used;
using the graphite material device in the application; and
receiving signals from the conductive pattern by a signal receiving and/or processing unit, whereby the signals indicate wear of the graphite material device as measured by the signals provided by the conductive pattern as the graphite material device wears from the wear surface.

7. The method of claim 6, wherein the graphite material device is any one of a carbon brush, a brake disc, a bushing and a bearing.

8. The graphite material device as claimed in claim 1, further comprising at least one sensor.

9. The graphite material device as claimed in claim 8, wherein the sensor is any one of a temperature sensor, a strain gauge and a high resistance cable, an accelerometer or a combination thereof.

10. The graphite material device as claimed in claim 8, wherein the conductive pattern and the sensor are arranged to transmit signals to a signal receiving and/or signal processing unit.

11. The graphite material device as claimed in claim 10, wherein the unit is arranged remotely from the device.

12. The graphite material device as claimed in claim 10, wherein the signals are transmitted wirelessly.

13. The graphite material device as claimed in claim 12, wherein the wireless transmission is through short range wireless transmission.

14. The graphite material device as claimed in claim 10, wherein the unit is integrated with the device.

15. The graphite material device as claimed in claim 10, wherein the signals are transmitted through wires.

16. The graphite material device as claimed in claim 1, wherein the graphite device is any one of a brake disk, a bushing and a bearing.

17. The graphite material device as claimed in claim 1, wherein the circuit board is provided onto the surface of the device.

18. The graphite material device as claimed in claim 1, wherein the circuit board is arranged within the device.

19. A graphite material device that is a carbon brush provided with at least one conductive pattern comprising a plurality of traces progressively distanced from the wear surface of the graphite material device,
wherein wear of the graphite material device is measured by signals provided by the conductive pattern as the graphite material device wears from the wear surface, and
wherein the at least one conductive pattern is provided as a circuit board.

20. The graphite material device as claimed in claim 19, wherein the circuit board is provided onto the surface of the device.

21. The graphite material device as claimed in claim 19, wherein the circuit board is arranged within the device.

* * * * *